US010768827B2

(12) United States Patent
Nadkarni

(10) Patent No.: US 10,768,827 B2
(45) Date of Patent: Sep. 8, 2020

(54) PERFORMANCE THROTTLING OF VIRTUAL DRIVES

(71) Applicant: Microsoft Technology Licensing, LLC, Redmond, WA (US)

(72) Inventor: Harshad Nadkarni, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 15/482,390

(22) Filed: Apr. 7, 2017

(65) Prior Publication Data

US 2018/0292999 A1    Oct. 11, 2018

(51) Int. Cl.
*G06F 12/02* (2006.01)
*G06F 3/06* (2006.01)

(52) U.S. Cl.
CPC ............ *G06F 3/0613* (2013.01); *G06F 3/067* (2013.01); *G06F 3/0631* (2013.01); *G06F 3/0656* (2013.01); *G06F 3/0665* (2013.01)

(58) Field of Classification Search
CPC ..................................................... G06F 3/0613
See application file for complete search history.

(56) References Cited

U.S. PATENT DOCUMENTS

| 8,214,590 | B2 | 7/2012 | Ulrich et al. | |
|---|---|---|---|---|
| 9,037,758 | B1 | 5/2015 | Sarkar et al. | |
| 9,075,530 | B2 | 7/2015 | Esaka et al. | |
| 9,342,801 | B2 | 5/2016 | Certain et al. | |
| 9,465,549 | B1 | 10/2016 | Faibish et al. | |
| 10,089,026 | B1* | 10/2018 | Puhov | G06F 3/0619 711/114 |
| 2013/0081014 | A1* | 3/2013 | Kadatch | G06F 9/5027 718/1 |
| 2014/0115579 | A1* | 4/2014 | Kong | G06F 3/0605 718/1 |

(Continued)

FOREIGN PATENT DOCUMENTS

CN    104778015 A    7/2015
WO    2016190893 A1    12/2016

OTHER PUBLICATIONS

Roth, et al., "Azure subscription and service limits, quotas, and constraints", https://docs.microsoft.com/en-us/azure/azure-subscription-service-limits, Published on: Feb. 17, 2017, 40 pages.

(Continued)

*Primary Examiner* — Charles Rones
*Assistant Examiner* — Ryan Dare
(74) *Attorney, Agent, or Firm* — Fiala & Weaver P.L.L.C.

(57) ABSTRACT

Methods, systems, apparatuses, and computer program products are provided that enable storage performance to be customized and throttled at the drive level. For example, performance metric(s) may be specified for virtual drive(s) assigned to a virtual machine. Physical storage disk(s), which are mapped to the drive(s), may be allocated based on the specified performance metric(s). By providing a means to customize and throttle on a per-drive basis, each function of the virtual machine can be provided a dedicated channel for input/output transactions, thereby ensuring that no function is starved of resources.

20 Claims, 6 Drawing Sheets

(56) References Cited

U.S. PATENT DOCUMENTS

| | | | |
|---|---|---|---|
| 2014/0195770 A1* | 7/2014 | Nishtala | G06F 3/0644 |
| | | | 711/173 |
| 2014/0325262 A1* | 10/2014 | Cooper | G06F 11/108 |
| | | | 714/6.22 |
| 2015/0058475 A1* | 2/2015 | Earl | H04L 47/741 |
| | | | 709/224 |
| 2016/0139834 A1* | 5/2016 | Hanson | H04L 67/30 |
| | | | 711/114 |
| 2017/0041244 A1 | 2/2017 | Conner et al. | |
| 2018/0225149 A1* | 8/2018 | Bianchini | G06F 9/5016 |

OTHER PUBLICATIONS

Fould, et al., "Azure Premium Storage: Design for High Performance", https://docs.microsoft.com/en-us/azure/storage/storage-premium-storage-performance, Published on: Oct. 18, 2016, 31 pages.

"Optimizing Persistent Disk and Local SSD Performance", https://cloud.google.com/compute/docs/disks/performance, Retrieved on: Mar. 1, 2017, 18 pages.

Shahan, et al., "High-Performance Premium Storage and unmanaged and managed Azure VM Disks", https://docs.microsoft.com/en-us/azure/storage/storage-premium-storage-performance, Published on: Feb. 6, 2017, 15 pages.

"RAID 0 vs. RAID 1," Diffen LLC, published on Apr. 7, 2013 and retrieved from http://web.archive.org/web/20130407014916/https://www.diffen.com/difference/RAID_0_vs_RAID_1 on Aug. 19, 2019.

* cited by examiner

PERFORMANCE THROTTLING OF VIRTUAL DRIVES

BACKGROUND

As an increasing number of applications and services are being made available over networks such as the Internet, an increasing number of content, application, and/or service providers are turning to technologies such as cloud computing. Cloud computing, in general, is an approach to provide access to resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Generally, resources provided by the cloud are configured based on the application for which the user would like to run on the cloud. However, situations may arise where inefficient functions of the application consume much of the resources availed to the application, thereby starving other functions of the application and/or other applications of the resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein enable storage performance to be customized and throttled at the virtual drive level. For example, one or more performance metrics may be specified for one or more virtual drives assigned to a machine, such as a virtual machine. One or more physical storage disks, which are mapped to the one or more virtual drives, may be allocated based on the specified performance metric(s). By providing a means to customize and throttle on a per-drive basis, each function that relies on a given virtual drive can be provided with a dedicated channel for input/output transactions that achieves a desired level of performance, thereby ensuring that the function is not starved of resources.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
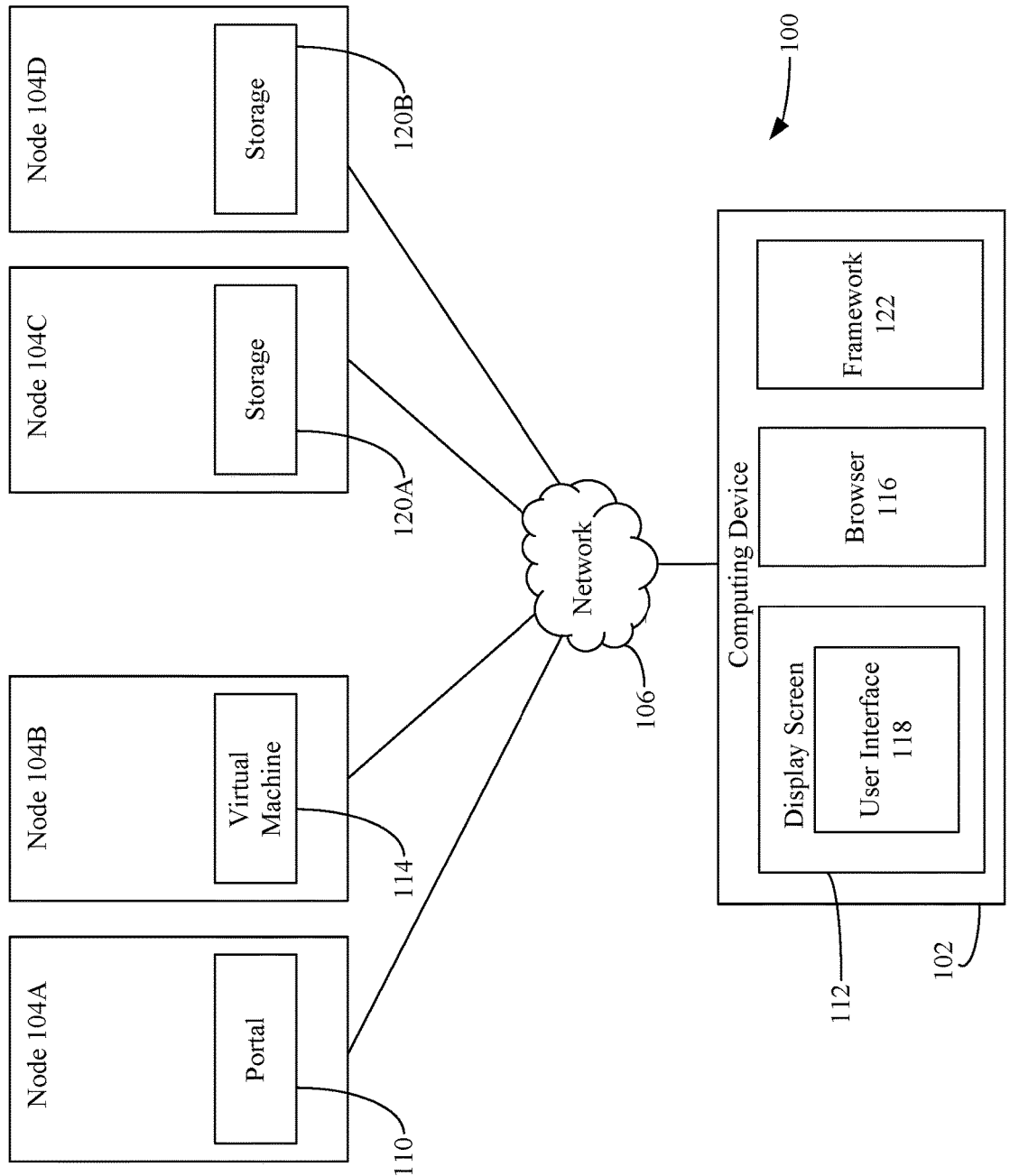
FIG. 1 shows a block diagram of a system for optimizing storage maintained by a network-accessible server set, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Exemplary Embodiments

Embodiments disclosed herein enable storage performance to be customized and throttled at the virtual drive level. For example, one or more performance metrics may be specified for one or more virtual drives assigned to a machine, such as a virtual machine. One or more physical storage disks, which are mapped to the one or more virtual drives, may be allocated based on the specified performance metric(s). By providing a means to customize and throttle on a per-drive basis, each function (e.g., each function of an application) that relies on a given virtual drive can be provided with a dedicated channel for input/output transactions that achieves a desired level of performance, thereby ensuring that the function is not starved of resources.

For instance, FIG. 1 shows a block diagram of a system 100 for optimizing storage maintained by a network-accessible server set, according to an example embodiment. As shown in FIG. 1, system 100 includes a computing device 102 and a plurality of nodes 104A, 104B, 104C, and 104D. Computing device 102 and each of nodes 104A, 104B, 104C, and 104D may be communicatively connected via a network 106. Network 106 may comprise one or more networks such as local area networks (LANs), wide area networks (WANs), enterprise networks, the Internet, etc., and may include one or more of wired and/or wireless portions.

Nodes 104A, 104B, 104C, and 104D may form a network-accessible server set. For example, each of nodes 104A, 104B, 104C, and 104D may comprise a group of one or more servers or a collection of servers (e.g., computing devices) that are each accessible via a network (e.g., in a "cloud-based" embodiment) to build, deploy, and manage applications and services. In an embodiment, the server(s) of a node may be co-located (e.g., housed in one or more nearby buildings with associated components such as backup power supplies, redundant data communications, environmental controls, etc.) to form a datacenter, or may be arranged in other manners. Accordingly, in an embodiment, nodes 104A-104D may each be a datacenter in a distributed collection of datacenters.

Each of node(s) 104A, 104B, 104C, and 104D may be configured to execute one or more software applications (or "applications") and maintain hardware resources (e.g., processors, memory, storage (e.g., physical storage disks), etc.), which may be utilized by users (e.g., customers) of the network-accessible server set. Node(s) 104A, 104B, 104C, and 104D may also be configured for specific uses, for example, a database server (e.g., a Microsoft SQL Server), an Online Analytical Processing (OLAP) server, etc.).

A user may be enabled to utilize the services offered by the network-accessible server set. For example, a customer may be enabled to utilize the services offered by the network-accessible server set by signing-up with a subscription with a service provider of the network-accessible server set. The user may be given access to a portal executing on one or more of node(s) 104A, 104B, 104C, and 104D. For example, as shown in FIG. 1, a portal 110 is executing on node 104A. Portal 110 may be configured to enable a user to build, manage, and/or monitor applications (e.g., simple web applications to complex cloud-based applications) and/or or enable a user to configure one or more of node(s) 104A, 104B, 104C, and 104D to operate as a database server, OLAP server, etc.

A user may access portal 110 via computing device 102. As shown in FIG. 1, computing device 102 includes a display screen 112 and a browser 116. A user may access portal 110 by interacting with an application at computing device 102 capable of accessing portal 110. For example, the user may use browser 116 to traverse a network address (e.g., a uniform resource locator) to portal 110, which invokes a user interface 118 (e.g., a web page) in a browser window rendered on computing device 102. By interacting with the user interface, the user may utilize portal 110 to launch virtual machines and applications, request hardware resources, and/or configure node(s) 104A, 104B, 104C, and/or 104D for various operations. Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

When configuring node(s) 104A, 104B, 104C, and/or 104D to operate as a database server, portal 110 may be used to provision a virtual machine running a database server application (e.g., Microsoft SQL Server). For example, as shown in FIG. 1, a user has utilized portal 110 to provision a virtual machine 114 to execute on node 104B. Virtual machine 114 is running a database server application. When requesting a virtual machine 114 to be provisioned, a user may be enabled to specify and/or select the hardware resources of node(s) 104A, 104B, 104C and/or 104D on which virtual machine 114 is to be executed. The hardware resources may be determined by or recommended to the user based on the applications/services being set up by or for the user. The hardware resources that may be specified and/or selected may include, but are not limited to, a number of processor or processor cores to be utilized (e.g., 2 processors, 8 processor cores, 16 processor cores, etc.), a total amount of storage to be utilized (e.g., 56 Gigabytes (GB), 112 GB, etc.), a total number of physical data disks to be allocated (e.g., 16 data disks, 32 data disks), etc. The user may also specify and/or select certain performance metrics associated with the hardware resources being allocated (e.g., a maximum number of input/output operations per second (IOPS) (e.g., 25600 TOPS, 50000 IOPS, etc.) and/or throughput (e.g., in megabytes (MB)) that the total number of physical data disks can sustain.

Once the hardware resources and/or performance metrics are determined, portal 110 may provision virtual machine 114 accordingly and may also allocate storage (e.g., storage 120A and/or storage 120B) to be utilized by virtual machine 114 on one or more of node(s) 104A, 104B, 104C and/or 104D. Each of storage 120A and/or storage 120B may comprise any number of physical storage disks (e.g., hard drives). It is noted that while portal 110, virtual machine 114, storage 120A and storage 120B are executed and/or located on different nodes, each of portal 110, virtual machine 114, storage 120A and/or storage 120B may be executed and/or located on the same node.

In accordance with an embodiment, one or more virtual drives may be assigned to virtual machine 114. A subset of the physical storage disks allocated may be mapped to each of the virtual drives. The number of virtual drives assigned to virtual machine 114 and/or the type of data stored by each virtual drive may vary depending on a purpose for which virtual machine 114 is configured. For example, in an embodiment in which virtual machine 114 is configured to operate as a database server, three virtual drives may be assigned to virtual machine 114: a data virtual drive, a log virtual drive, and a backup virtual drive. The data virtual drive may be configured to store data associated with a database maintained by the database server (e.g., tables). The log virtual drive may be configured to store a history of actions and changes made to the data stored by the data virtual drive. The backup virtual drive may be configured to store backups of the data and/or logs stored by the data virtual drive and the log virtual drive.

One or more virtual drives attached to a virtual machine may support only a maximum number of input/output operations per second (TOPS). In certain situations, a function of a virtual machine may consume most or all of the IOPS supported by the virtual drive(s) such that other functions of the virtual machine that access data on the same virtual drive(s) are only able to consume a relatively lower number of IOPS, or no IOPS. For example, a backup function of the virtual machine may consume most or all of the IOPS supported by virtual drive(s) and not leave any IOPS for a data function, logging function, or other function of the virtual machine that accesses data on the same virtual drive(s).

In accordance with an embodiment, to prevent such a situation, a different virtual drive may be assigned to each function of a virtual machine and the utilization of each virtual drive (e.g., the number of IOPS) may be throttled (i.e., set to a particular level), thereby ensuring that each of the functions receives a desired number of IOPS. By assigning a different virtual drive to each function and providing a means to throttle per virtual drive, each function is provided a dedicated channel for input/output transactions having an acceptable level of performance.

In accordance with an embodiment, the assignment of virtual drives to functions and the throttling of such virtual drives may be configured by a user by accessing portal 110 via browser 116. Once accessed, portal 110 may enable the user to assign a different virtual drive to each of a plurality of functions performed by virtual machine 114 and to also specify a number of IOPS to be allocated for each such virtual drive.

In accordance with another embodiment, portal 110 may be accessed via a task automation and configuration management framework (i.e., framework 122), such as Microsoft PowerShell. Using framework 122, the user may execute a script (e.g., a PowerShell script), which, when executed, provides a user interface (e.g., a graphical user interface, a command line interface, a command line shell, etc.) at computing device 102. The user interface may prompt the user to specify a username, a password, an identifier (e.g., name) of the node and/or a server included in the node) on which virtual machine 114 is executing and/or an identifier of the user's subscription with the service provider of the network-accessible server set. The username, the password, and/or identifier(s) are provided to portal 110, and portal 110 verifies whether the user has a valid subscription with the service provider. Once the user has been verified, the script may prompt the user to specify a number of IOPS to be allocated for one or more virtual drives assigned to a virtual machine (e.g., virtual machine 114) configured for the user. Each virtual drive may be assigned to a different function of virtual machine 114. Portal 110 utilizes the information specified by the user to allocate physical storage disk(s) for each virtual drive based on the specified number of IOPS. It is noted that while the foregoing states that the script is executed after virtual machine 114 has been provisioned and after virtual drive(s) have been assigned thereto, in certain embodiments, the provisioning of virtual machine 114 and/or the assignment of virtual drive(s) thereto may also be performed via the script. In accordance with an embodiment, framework 122 also provides an application programming interface (API) that enables one or more other software applications to specify and provide to portal 110 the node and/or server identifier, the subscription identifier, and/or number of IOPS for each virtual drive.

In accordance with an embodiment, each virtual drive may be throttled differently such that each virtual drive can handle a different number of IOPS. In accordance with such an embodiment, the user may be prompted to specify a number of IOPS for each virtual drive (e.g., a data virtual drive, a log virtual drive and a backup virtual drive). Each physical storage disk may be capable of handling a maximum number of IOPS (e.g., 500 IOPS). Thus, the number of physical storage disks allocated for each virtual drive is dependent on the number of IOPS specified therefor. In accordance with an embodiment, the number of physical storage disks allocated is determined in accordance with Equation 1, which is shown below:

Allocated PSDs=IOPS Specified for VD/Maximum Number of IOPS Supported by Each PSD    (Equation 1)

where PSDs stands for physical storage disks, and VD stands for virtual drive. For example, if each physical storage disk of storage 120A and/or 120B is capable of supporting a maximum number of 500 IOPS, and the number of IOPS specified for a particular virtual drive is 10000 IOPS, then the total number of physical storage disks allocated for the virtual drive is 20 (10000/500).

Figure 2:
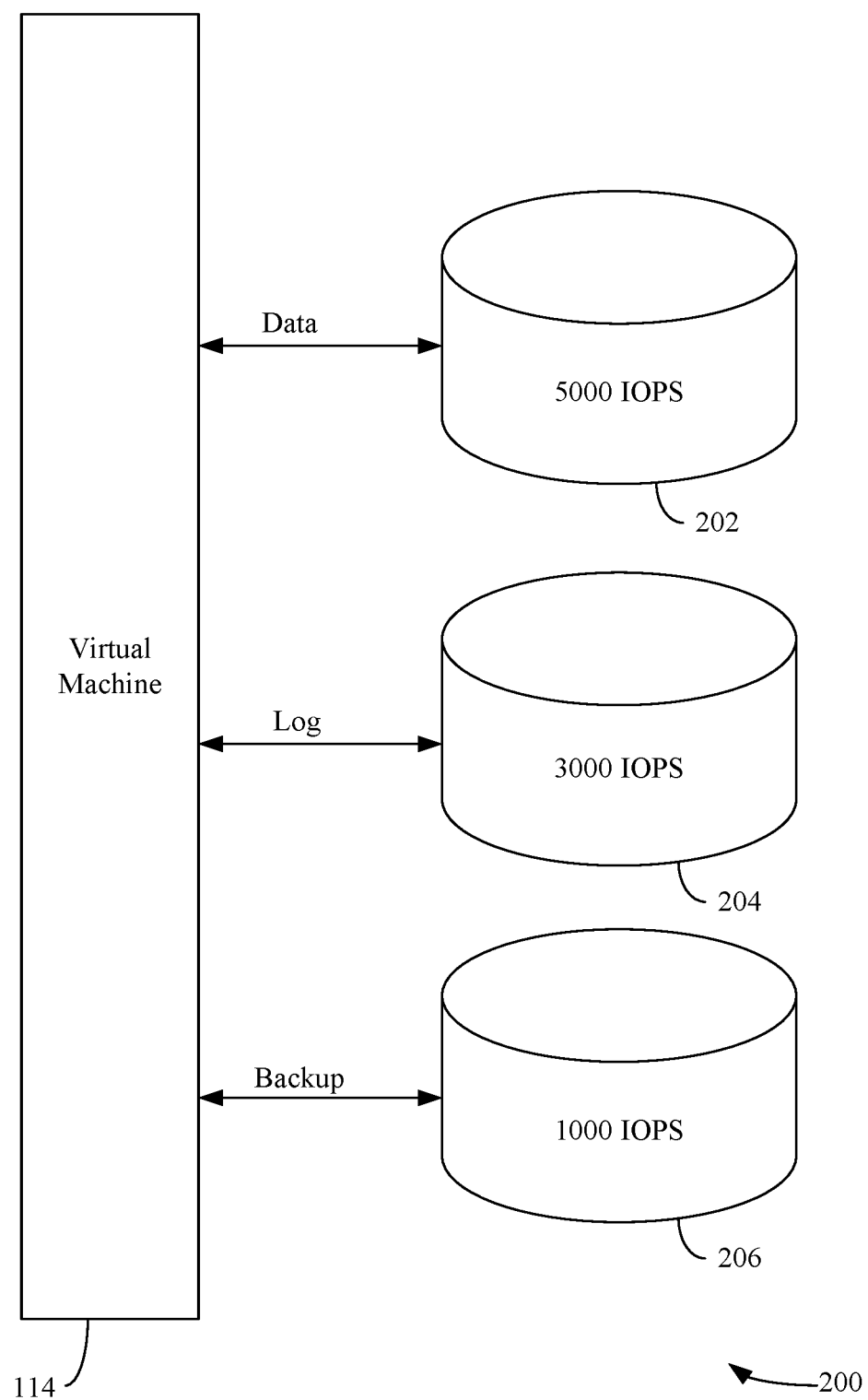
FIG. 2 depicts a block diagram of a system in which a virtual machine has been assigned and is communicatively coupled to a first virtual drive, a second virtual drive, and a third virtual drive, according to an example embodiment.

For example, FIG. 2 depicts a block diagram of a system 200 in which virtual machine 114 has been assigned and is communicatively coupled to a first virtual drive 202, a second virtual drive 204, and a third virtual drive 206 in accordance with an embodiment. In the example shown in FIG. 2, virtual machine 114 is configured as a database server. In particular, virtual machine 114 is configured to perform a data function that includes transmitting and/or receiving data (e.g., SQL data) to/from first virtual drive 202, to perform a data logging function that includes transmitting and/or receiving log information (e.g., SQL log information) to/from second virtual drive 204, and to perform a backup function that includes transmitting and/or receiving backup data (e.g., SQL backup information) to/from third virtual drive 206. As shown in FIG. 2, first virtual drive 202 has been configured to support up to 5000 IOPS, second virtual drive 204 has been configured to support up to 3000 IOPS and third virtual drive 206 has been configured to support up to 1000 IOPS. Thus, portal 110 has allocated 10 (10000/500) physical storage disks for first virtual drive 202, 6 (3000/500) physical storage disks for second virtual drive 204 and 2 (1000/500) physical storage disks for third virtual drive 206.

Figure 3:
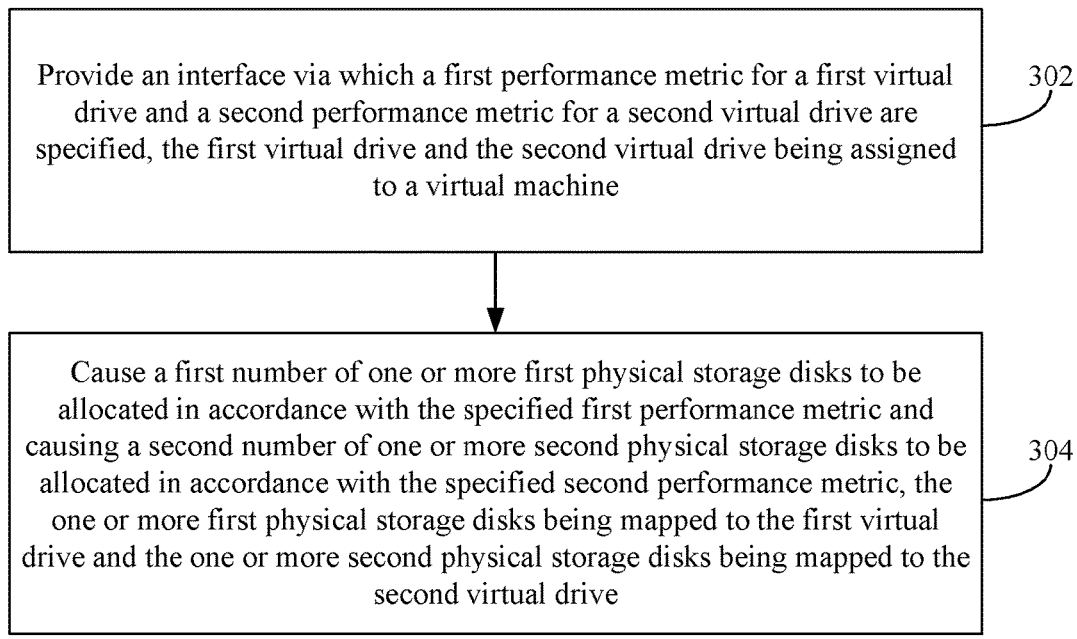
FIG. 3 depicts a flowchart of a method for customizing the performance of storage on a per-virtual drive basis, according to an example embodiment.
Figure 4:
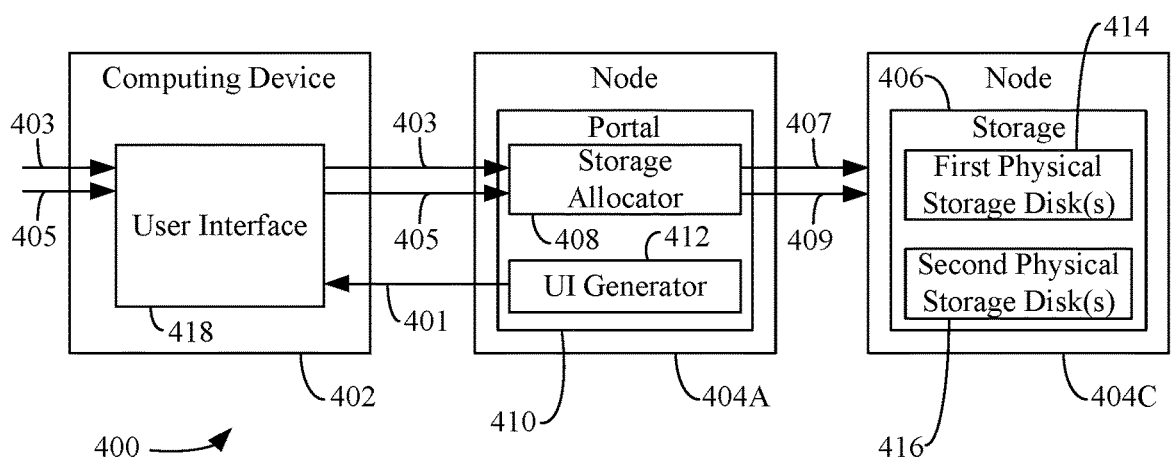
FIG. 4 is a block diagram of system comprising a computing device, a first node and a second node, according to an example embodiment.

Accordingly, in embodiments, the performance of storage associated with a virtual machine may be throttled and customized in many ways. For instance, FIG. 3 depicts a flowchart 300 of a method for customizing the performance of storage on a per-virtual drive basis in accordance with an embodiment. In an embodiment, flowchart 300 may be implemented by a node 404A, as shown in FIG. 4. FIG. 4 is a block diagram of a system 400 comprising a computing device 402, a first node 404A, and a second node 404C in accordance with an embodiment. Node 404A is an example of node 104A, as described above with reference to FIG. 1. As shown in FIG. 4, node 404A is communicatively coupled to computing device 402 and node 404C. Computing device 402 is an example of computing device 102, and node 404C is an example of node 104C and/or node 104D, as described above with reference to FIG. 1. Node 404A comprises a portal 410 executing thereon. Portal 410 comprises a storage allocator 408 and a user interface (UI) generator 412. Portal 410 is an example of portal 110, as described above with reference to FIG. 1. Computing device 402 comprises a user interface 418, which is an example of user interface 118, as described above with reference to FIG. 1. Node 404C comprises a storage 406, which is an example of storage 120A and/or storage 120B, as described above with reference to FIG. 1. Other structural and operational embodiments will be apparent to persons skilled in the relevant art(s) based on the following discussion regarding flowchart 300 and system 400 of FIG. 4.

Flowchart 300 begins with step 302. In step 302, an interface via which a first performance metric for a first virtual drive and a second performance metric for a second virtual drive are specified is provided, the first virtual drive and the second virtual drive being assigned to a virtual machine. For example, with reference to FIG. 4, UI generator 412 provides user interface information 401 (e.g., one or more web pages, image content, etc.) to computing device 402, which uses user interface information 401 to render user interface 418 on a display screen (not shown) of computing device 402. A user may interact with user interface 418 to provide a first user input 403 that specifies a first performance metric for a first virtual drive and a second user input 405 that specifies a second performance metric for a second virtual drive. User interface 418 provides first user input 403 and second user input 405 to node 404A.

In accordance with an embodiment, user interface 418 may be provided via a task automation and configuration management framework (e.g., framework 122, as shown in FIG. 1). For example, via the framework, a user may execute a script, which, when executed, provides user interface 418. In accordance with another embodiment, the interface of step 302 is an API provided by the task automation and configuration management framework that enables other software application(s) to specify and provide the first performance metric and/or the second performance metric.

At step 304, a first number of one or more first physical storage disks is caused to be allocated in accordance with the specified first performance metric and a second number of one or more second physical storage disks is caused to be allocated in accordance with the specified second performance metric, the one or more first physical storage disks being mapped to the first virtual drive and the one or more second physical storage disks being mapped to the second virtual drive. For example, with reference to FIG. 4, storage allocator 408 may provide one or more commands 407 including the specified first performance metric to node 404C that causes one or more first physical storage disks 414 to be allocated in accordance with the first performance metric and may provide command(s) 409 including the specified second performance metric to node 404C that causes one or more second physical storage disks 416 to be allocated in accordance with the first performance metric.

In accordance with one or more embodiments, the virtual machine is executing on a network-accessible server set comprising a plurality of computing nodes (e.g., nodes 104A, node 104B, node 104C and/or node 104D), and the one or more first physical storage disks and the one or more second physical storage disks are maintained by the network-accessible server set In accordance with one or more embodiments, the first virtual drive is assigned to a first function of the virtual machine to store therefor a first type of data, and the second virtual drive is assigned to a second function of the virtual machine to store therefor a second type of data that is different than the first type of data.

In accordance with one or more embodiments, the first function is one of a data function and the first type of data is data associated with a database, a log function and the first type of data is log information that indicates changes made to the data associated with the database, or a backup function and the first type of data is backup data associated with the database. The second function is one of the data function and the first type of data is data associated with a database, the log function and the first type of data is log information that indicates changes made to the data associated with the database, or the backup function and the first type of data is backup data associated with the database, where the first function is different than the second function.

In accordance with one or more embodiments, the first performance metric corresponds to a first maximum number of IOPS supported by the first virtual drive, and the second performance metric corresponds to a second maximum number of IOPS supported by the second virtual drive.

In accordance with one or more embodiments, the first performance metric is different than the second performance metric. For example, the first performance metric may be 5000 IOPS, and the second performance metric may be 1000 IOPS.

In accordance with one or more embodiments, the first number of the one or more first physical storage disks that are allocated are based on the first maximum number of IOPS and a maximum number of IOPS supported by each of the one or more first physical storage disks, and the second number of the one or more second physical storage disks that are allocated are based on the second maximum number of IOPS and a maximum number of IOPS supported by each of the one or more second physical storage disks.

In accordance with one or more embodiments, the first number of the one or more first physical storage disks that are allocated is equal to the first maximum number of IOPS divided by the maximum number of IOPS supported by each of the one or more first physical storage disks, and the second number of the one or more second physical storage disks that are allocated is equal to the second maximum number of IOPS divided by the maximum number of IOPS supported by each of the one or more second physical storage disks. For example, the first number and the second number may be determined in accordance with Equation 1 described above.

In accordance with an embodiment, each virtual drive may be throttled similarly such that each virtual drive can handle the same number of IOPS. In accordance with such an embodiment, and referring again to FIG. 1, a single number of IOPS (representing the cumulative maximum number of IOPS for the virtual drives, collectively) may be specified (e.g., via user interface 118, a script, and/or an API) that is to be distributed evenly between each virtual drive assigned to virtual machine 114. In accordance with such an embodiment, the number of physical storage disks allocated for each virtual drive is determined in accordance with Equation 2 and 3, which are shown below:

$$\text{IOPS Per VD} = \text{IOPS Specified/Number of VDs Assigned to VM} \quad \text{(Equation 2)}$$

$$\text{Allocated PSDs} = \text{IOPS Per VD/Maximum Number of IOPS Supported by Each PSD} \quad \text{(Equation 3)}$$

where VM stands for virtual machine. For example, if the number of IOPS specified is 15000 IOPS, and three virtual drives have been assigned to a virtual machine, then the IOPS per virtual drive is 5000 IOPS (15000/3). If each physical storage disk of storage 120A and/or 120B is capable of supporting a maximum number of 500 IOPS, the number of physical storage disks allocated for each of the three virtual drives is 10 (5000/500).

Figure 5:
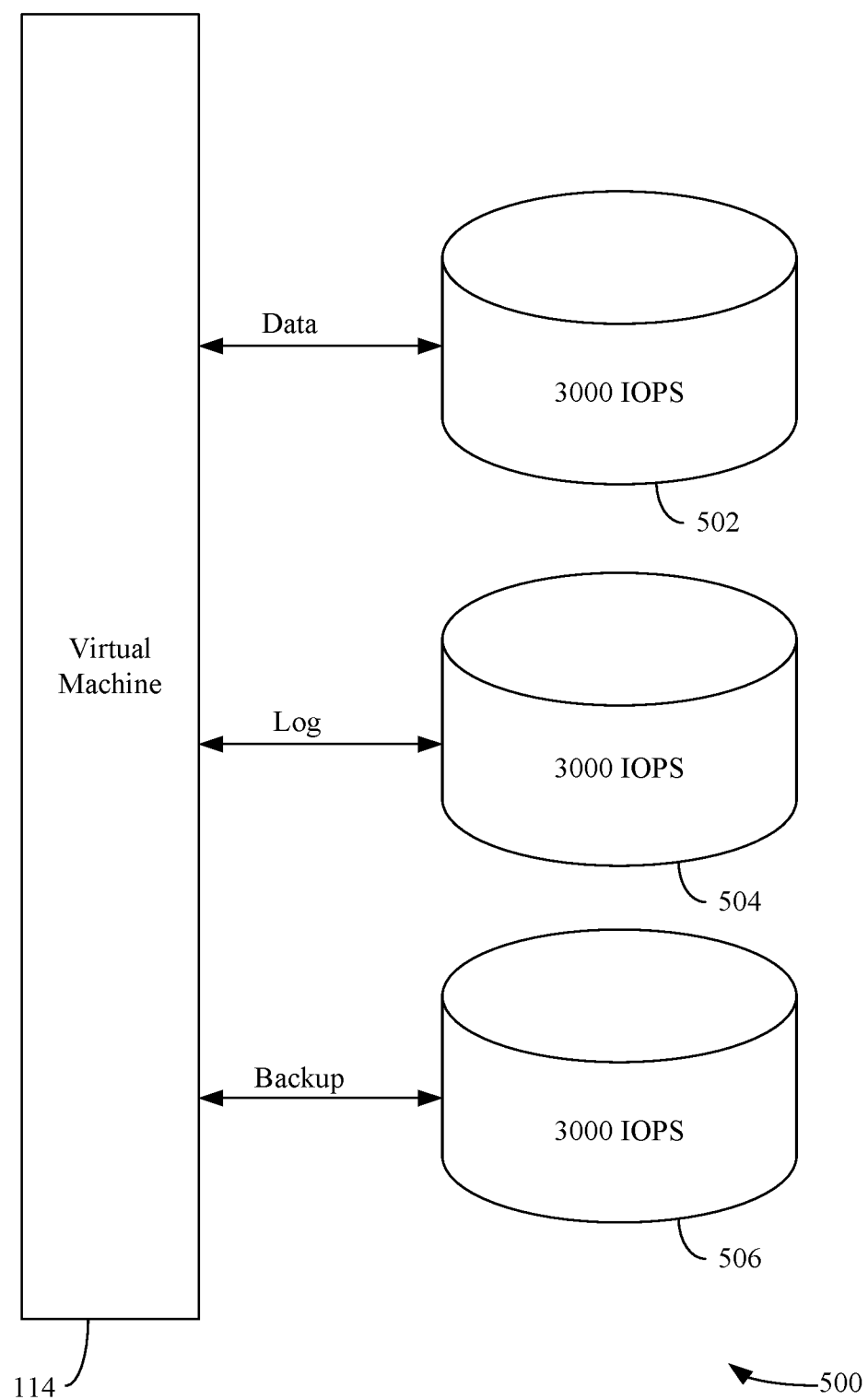
FIG. 5 depicts a block diagram of a system in which a virtual machine has been assigned and is communicatively coupled to a first virtual drive, a second virtual drive, and a third virtual drive, according to another example embodiment.

FIG. 5 depicts a block diagram of a system 500 in which virtual machine 114 has been assigned and is communicatively coupled to a first virtual drive 502, a second virtual drive 504, and a third virtual drive 506 in accordance with an embodiment. In the example shown in FIG. 5, virtual machine 114 is configured as a database server. In particular, virtual machine 114 is configured to perform a data function that includes transmitting and/or receiving data (e.g., SQL data) to/from first virtual drive 502, to perform a data logging function that includes transmitting and/or receiving log information (e.g., SQL log info) to/from second virtual drive 504, and to perform a backup function that includes transmitting and/or receiving backup data (e.g., SQL backup information) to/from third virtual drive 506. In the example shown in FIG. 5, the specified number of IOPS is 9000 IOPS. Thus, each of first virtual drive 502, second virtual drive 504 and third virtual drive 506 have been configured to support up to 3000 IOPS. Thus, portal 110 has allocated 6 (3000/500) physical storage disks for each of first virtual drive 502, second virtual drive 504 and third virtual drive 506.

Figure 6:
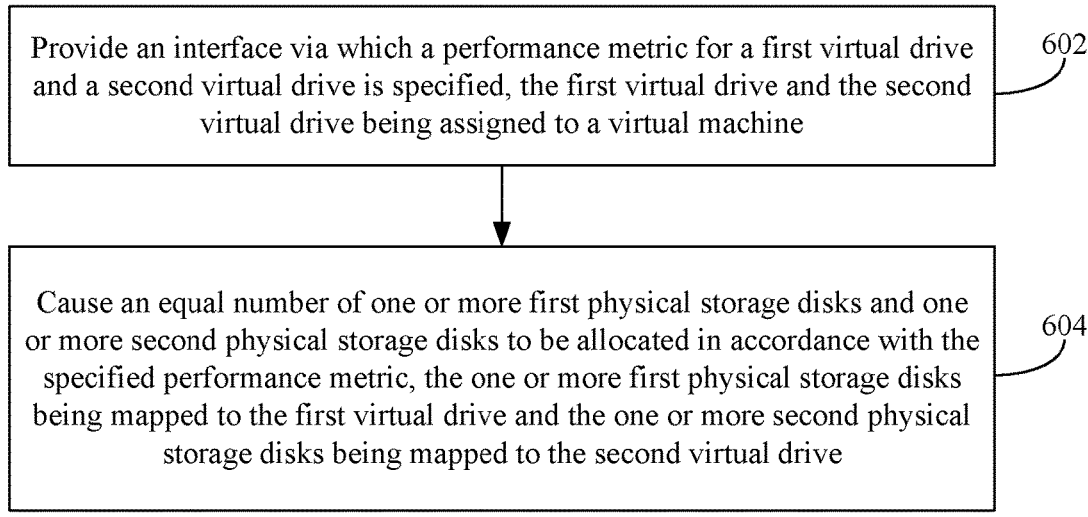
FIG. 6 depicts a flowchart of a method for customizing the performance of a plurality of virtual drives such that each virtual drive is configured to achieve the same performance, according to an example embodiment.
Figure 7:
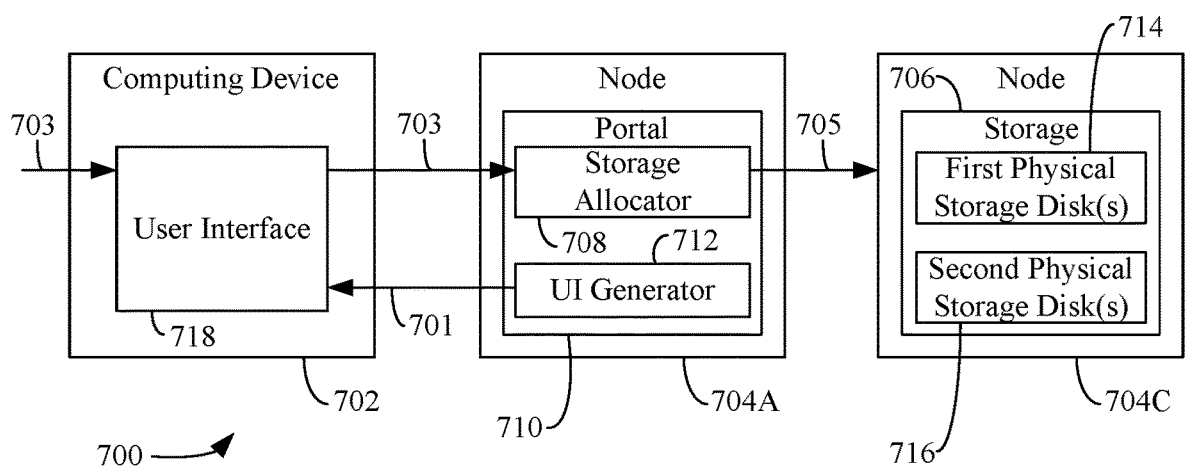
FIG. 7 is a block diagram of system comprising a computing devices, a first node and a second node, according to another example embodiment.

FIG. 6 depicts a flowchart 600 of a method for customizing the performance of storage such that each virtual drive is configured for the same performance in accordance with an embodiment. In an embodiment, flowchart 600 may be implemented by a node 704A, as shown in FIG. 7. FIG. 7 is a block diagram of system 700 comprising a computing device 702, a first node 704A, and a second node 704C in accordance with an embodiment. Node 704A is an example of node 104A, as described above with reference to FIG. 1. As shown in FIG. 7, node 704A is communicatively coupled to computing device 702 and node 704C. Computing device 702 is an example of computing device 102, and node 704C is an example of node 104C and/or node 104D, as described above with reference to FIG. 1. Node 704C comprises a portal 710 executing thereon. Portal 710 comprises a storage allocator 708 and a user interface (UI) generator 712. Portal 710 is an example of portal 110, as described above with reference to FIG. 1. Computing device(s) 702 comprises a user interface 718, which is an example of user interface 118, as described above with reference to FIG. 1. Node 704C comprises a storage 706, which is an example of storage 120A and/or storage 120B, as described above with reference to FIG. 1. Other structural and operational embodiments will be apparent to persons skilled in the relevant art(s) based on the following discussion regarding flowchart 600 and system 700 of FIG. 7.

Flowchart 600 begins with step 602. In step 620, an interface via which a performance metric for a first virtual drive and a second virtual drive is specified is provided, the first virtual drive and the second virtual drive being assigned to a virtual machine. For example, with reference to FIG. 7, UI generator 712 provides user interface information 701 (e.g., one or more web pages, image content, etc.) to computing device 702, which uses user interface information 701 to render user interface 718 on a display screen (not shown) of computing device 402. A user may interact with user interface 718 to provide a user input 703 that specifies a performance metric for a first virtual drive and a second virtual drive. User interface 718 provides user input 703 to node 704A.

In accordance with an embodiment, user interface 718 may be provided via a task automation and configuration management framework (e.g., framework 122, as shown in FIG. 1). For example, using the framework, a user may execute a script, which, when executed, provides user interface 718. In accordance with another embodiment, the interface of step 602 is an API provided by the task automation and configuration management framework that enables other software application(s) to specify and provide the first performance metric and/or the second performance metric.

At step 604, an equal number of one or more first physical storage disks and one or more second physical storage disks are caused to be allocated in accordance with the specified performance metric, the one or more first physical storage disks being mapped to the first virtual drive and the one or more second physical storage disks being mapped to the second virtual drive. For example, with reference to FIG. 7, storage allocator 708 may provide one or more commands 705 including the specified performance metric to node 704C that causes one or more first physical storage disks 714 and one or more second physical storage disks 716 to be allocated in accordance with the specified performance metric.

In accordance with one or more embodiments, the virtual machine is executing on a network-accessible server set comprising a plurality of computing nodes (e.g., nodes 104A, node 104B, node 104C and/or node 104D), and the one or more first physical storage disks and the one or more second physical storage disks are maintained by the network-accessible server set.

In accordance with one or more embodiments, the one or more first physical storage disks are assigned to a first function of the virtual machine to store therefor a first type of data, and the one or more second physical storage disks are assigned to a second function of the virtual machine to store therefor a second type of data that is different than the first type of data.

In accordance with one or more embodiments, the first function is a data function and the In accordance with one or more embodiments, the first function is one of a data function and the first type of data is data associated with a database, a log function and the first type of data is log information that indicates changes made to the data associated with the database, or a backup function and the first type of data is backup data associated with the database. The second function is one of the data function and the first type of data is data associated with a database, the log function and the first type of data is log information that indicates changes made to the data associated with the database, or the backup function and the first type of data is backup data associated with the database, where the first function is different than the second function.

In accordance with one or more embodiments, the performance metric corresponds to a cumulative maximum number of IOPS supported by the first virtual drive and the second virtual drive.

In accordance with one or more embodiments, the equal number of the one or more first physical storage disks and the one or more second physical storage disks is based on the cumulative maximum number of IOPS and a maximum number of IOPS supported by each of the one or more first physical storage disks and the one or more second physical storage disks. For example, the equal number may be determined in accordance with Equations 2 and 3 described above.

III. Additional Embodiments

In accordance with one or more embodiments, in lieu of specifying IOPS for one or more virtual drives, IOPS may instead be specified for one or more functions of a virtual machine, such as, but not limited to a data function that accesses (e.g., reads and/or writes) data associated with a database, a log function that accesses (e.g., reads and/or writes) log information that indicates changes made to the data associated with the database, and/or a backup function that accesses (e.g., reads and/or writes) backup information associated with the data and/or log information. The IOPS specified for each function may then be used to allocate physical disks to one or more virtual drives that are or will be assigned to or for use by that function in accordance with the techniques described above. In accordance with such embodiments, the virtual drive(s) that are assigned to each function need not be known to the user specifying the IOPS.

Moreover, the function(s) to which virtual drive(s) are assigned may not be limited to the same application. For example, each of the virtual drive(s) may assigned a function of a different application. That is, a first virtual drive may be assigned a function a first application, and a second virtual drive may be assigned a function of a second application that is different than the first application. Furthermore, the function(s) may associated with entities other than applications, such as, but not limited to an operating system (or any process thereof).

In accordance with one or more embodiments, a user may be enabled to throttle and customize performance based on the age of the data being stored. For example, in a system in which physical storage disks included therein have varying maximum speeds (e.g., revolutions per minute (RPM)) relatively older data may be stored on relatively slower physical storage disks (e.g., disks having a relatively lower RPM) and relatively newer data may be stored on relatively faster physical storage disks (e.g., disks having a relatively higher RPM). In particular, more IOPS may be specified for newer data, and less IOPS may be specified for older data (e.g., backup data).

It is also noted that while the foregoing embodiments disclose that the number of physical storage disks that are allocated for a particular virtual drive are based on IOPS, other storage-related performance metric(s) may be used. For example, the allocation of physical storage disks may be based on the latency of input/output operations to and/from the physical storage disk(s), the throughput (e.g., the sustained and/or peak throughput) supported by the physical storage disk(s), etc.

It is further noted that while the foregoing embodiments disclose that the machines to which virtual drives are assigned are virtual machines, the embodiments described herein are not so limited. For example, virtual drives may also be assigned to physical machines (e.g., a computing device) and/or a combination of physical machines and virtual machines.

It is also noted that while performance of storage can be customized and throttled on a per-drive basis, techniques disclosed herein may also enable performance to be customized and throttled for a common storage pool comprising a plurality of virtual drives. For example, IOPS may be specified for the common storage pool, and each virtual drive included in the storage pool may share the IOPS without any control or cap on each individual virtual drive.

IV. Example Computer System Implementation

Computing device 102, nodes 104A-104D, portal 110, virtual machine 114, browser 116, user interface 118, framework 122, storage 120A and/or 120B, computing device 402, nodes 404A and/or 404C, storage allocator 408, UI generator 412, user interface 418, first physical storage disk(s) 414, second physical storage disk(s) 416, computing device 702, nodes 704A and/or 704C, storage allocator 708, UI generator 712, user interface 718, first physical storage disk(s) 714, second physical storage disk(s) 716, flowchart 300 and/or flowchart 600 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
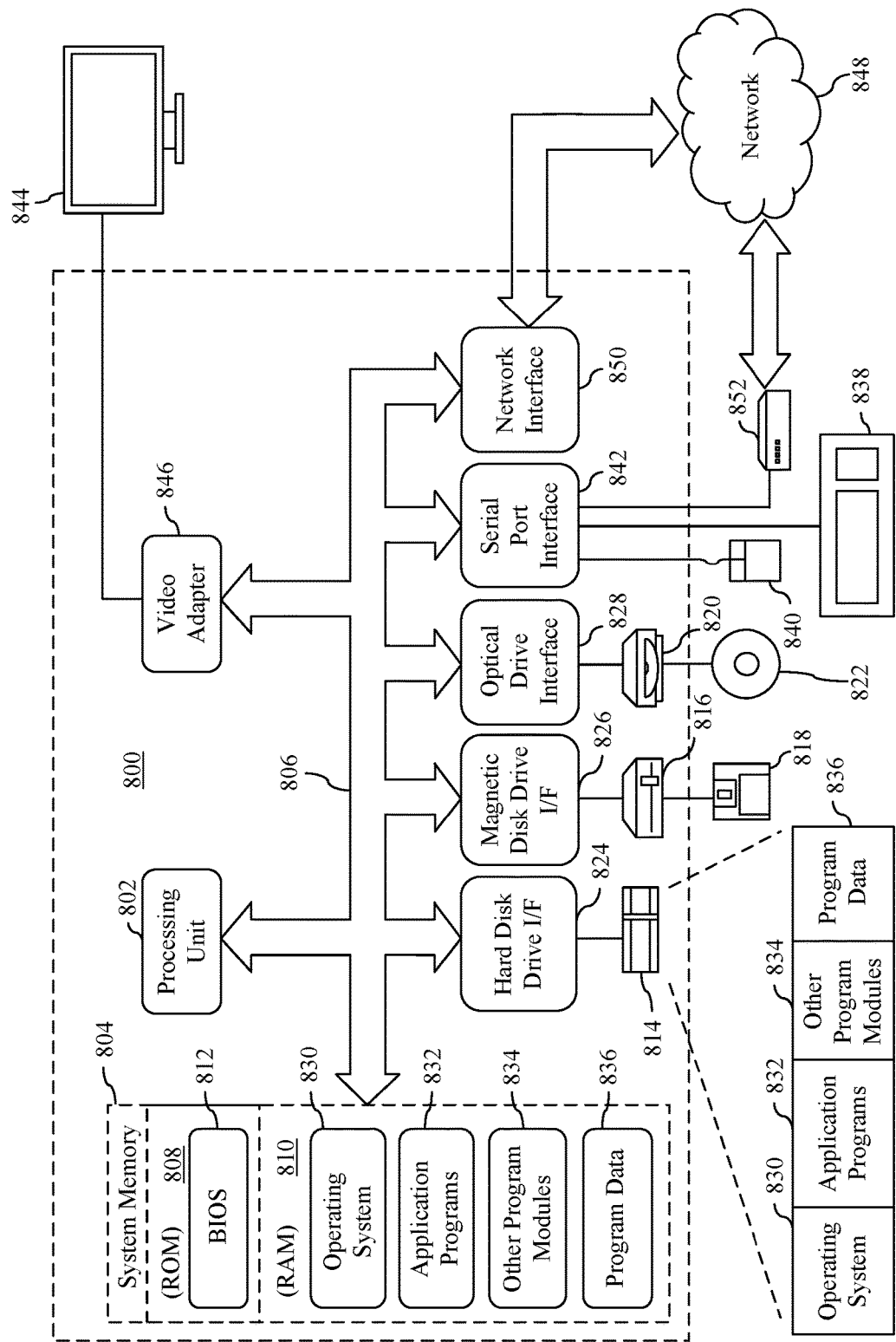
FIG. 8 is a block diagram of an example processor-based computer system that may be used to implement various embodiments.

FIG. 8 depicts an example processor-based computer system 800 that may be used to implement various embodiments described herein. For example, system 800 may be used to implement computing device 102, nodes 104A-104D, computing device 402, node 404A, node 404C, computing device 702, node 704A and/or node 704C, as described above in reference to FIGS. 1, 4 and 7. System 800 may also be used to implement any of the steps of any of the flowcharts of FIGS. 3 and 6, as described above. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more circuits (e.g. processor circuits), microprocessors or microprocessor cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all of the functions and features of computing device 102, nodes 104A-104D, computing device 402, node 404A, node 404C, computing device 702, node 704A and/or node 704C, as described above in reference to FIGS. 1, 4 and 7. The program modules may also include computer program logic that, when executed by processing unit 802, causes processing unit 802 to perform any of the steps of any of the flowcharts of FIGS. 3 and 6, as described above.

A user may enter commands and information into system 800 through input devices such as a keyboard 838 and a pointing device 840 (e.g., a mouse). Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB). Such interfaces may be wired or wireless interfaces.

Display 844 is connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface 850, a modem 852, or other suitable means for establishing communications over the network. Modem 852, which may be internal or external, is connected to bus 806 via serial port interface 842.

As used herein, the terms "computer program medium," "computer-readable medium," and "computer-readable storage medium" are used to generally refer to memory devices or storage structures such as the hard disk associated with hard disk drive 814, removable magnetic disk 818, removable optical disk 822, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable system 800 to implement features of embodiments discussed herein. Accordingly, such computer programs represent controllers of the system 800. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. Additional Example Embodiments

In one embodiment, a method comprises: providing an interface via which a first performance metric for a first virtual drive and a second performance metric for a second virtual drive are specified, the first virtual drive and the second virtual drive being assigned to a virtual machine; and causing a first number of one or more first physical storage disks to be allocated in accordance with the specified first performance metric and causing a second number of one or more second physical storage disks to be allocated in accordance with the specified second performance metric, the one or more first physical storage disks being mapped to the first virtual drive and the one or more second physical storage disks being mapped to the second virtual drive.

In an embodiment, the first performance metric is different than the second performance metric.

In an embodiment, the first virtual drive is assigned to a first function of the virtual machine to store therefor a first type of data, and the second virtual drive is assigned to a second function of the virtual machine to store therefor a second type of data that is different than the first type of data.

In an embodiment, the first function is of one of a data function and the first type of data is data associated with a database; a log function and the first type of data is log information that indicates changes made to the data associated with the database; or a backup function and the first type of data is backup data associated with the database, the second function is one of: the data function and the second type of data is data associated with the database; the log function and the second type of data is log information that indicates changes made to the data associated with the database; or the backup function and the second type of data is backup data associated with the database, and wherein the first function is different than the second function.

In an embodiment, the first performance metric corresponds to a first maximum number of input/output operations per second (IOPS) supported by the first virtual drive, and the second performance metric corresponds to a second maximum number of IOPS supported by the second virtual drive.

In an embodiment, the first number of the one or more first physical storage disks that are allocated is determined based on the first maximum number of IOPS and a maximum number of IOPS supported by each of the one or more first physical storage disks, and the second number of the one or more second physical storage disks that are allocated is determined based on the second maximum number of IOPS and a maximum number of IOPS supported by each of the one or more second physical storage disks.

In an embodiment, the first number of the one or more first physical storage disks that are allocated is equal to the first maximum number of IOPS divided by the maximum number of IOPS supported by each of the one or more first physical storage disks, and the second number of the one or more second physical storage disks that are allocated is equal to the second maximum number of IOPS divided by the maximum number of IOPS supported by each of the one or more second physical storage disks.

In an embodiment, the virtual machine is executing on a network-accessible server set comprising a plurality of computing nodes, and the one or more first physical storage disks and the one or more second physical storage disks are maintained by the network-accessible server set.

In an embodiment, a method comprises: providing an interface via which a first performance metric for a first function of a virtual machine and a second performance metric for a second function of the virtual machine are specified; and causing a first number of one or more first physical storage disks to be allocated to a first virtual disk in accordance with the specified first performance metric, the first virtual disk being assigned for use by the first function, and causing a second number of one or more second physical storage disks to be allocated to a second virtual disk in accordance with the specified second performance metric, the second virtual disk being assigned for use by the second data accessing function.

In an embodiment, the first performance metric is different than the second performance metric.

In an embodiment, each of the first function and the second function is one of: a data function configured to access data associated with a database; a log function configured to access log information that indicates changes made to the data associated with the database; or a backup function configured to access backup data associated with the database, and the first function is different than the second function.

In an embodiment, the first performance metric corresponds to a first maximum number of input/output operations per second (IOPS) supported by the first virtual disk, and the second performance metric corresponds to a second maximum number of IOPS supported by the second virtual disk.

In an embodiment, the first number of the one or more first physical storage disks that are allocated is determined based on the first maximum number of IOPS and a maximum number of IOPS supported by each of the one or more first physical storage disks, and the second number of the one or more second physical storage disks that are allocated is determined based on the second maximum number of IOPS and a maximum number of IOPS supported by each of the one or more second physical storage disks.

In an embodiment, the first number of the one or more first physical storage disks that are allocated is equal to the first maximum number of IOPS divided by the maximum number of IOPS supported by each of the one or more first physical storage disks, and the second number of the one or more second physical storage disks that are allocated is equal to the second maximum number of IOPS divided by the maximum number of IOPS supported by each of the one or more second physical storage disks.

In an embodiment, the virtual machine is executing on a network-accessible server set comprising a plurality of computing nodes, and the one or more first physical storage disks and the one or more second physical storage disks are maintained by the network-accessible server set.

In an embodiment, a method comprises: providing an interface via which a performance metric for a first virtual drive and a second virtual drive is specified, the first virtual drive and the second virtual drive being assigned to a virtual machine; and causing an equal number of one or more first physical storage disks and one or more second physical storage disks to be allocated in accordance with the specified performance metric, the one or more first physical storage disks being mapped to the first virtual drive and the one or more second physical storage disks being mapped to the second virtual drive.

In an embodiment, the first virtual drive is assigned to a first function of the virtual machine to store therefor a first type of data, and the second virtual drive is assigned to a second function of the virtual machine to store therefor a second type of data that is different than the first type of data.

In an embodiment, the first function is one of a data function and the first type of data is data associated with a database; a log function and the first type of data is log information that indicates changes made to the data associated with the database; or a backup function and the first type of data is backup data associated with the database, the second function is one of: the data function and the second type of data is data associated with the database; the log function and the second type of data is log information that indicates changes made to the data associated with the database; or the backup function and the second type of data is backup data associated with the database, and wherein the first function is different than the second function.

In an embodiment, the performance metric corresponds to a cumulative maximum number of input/output operations per second (IOPS) supported by the first virtual drive and the second virtual drive.

In an embodiment, the equal number of the one or more first physical storage disks and the one or more second physical storage disks is determined based on the cumulative maximum number of IOPS and a maximum number of IOPS supported by each of the one or more first physical storage disks and the one or more second physical storage disks.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
providing an interface via which a first performance metric for a first function of a virtual machine and a second performance metric for a second function of the virtual machine are specified, a first virtual drive and a second virtual drive being assigned to the virtual machine, the first virtual drive being assigned to the first function of the virtual machine to store therefor a first type of data associated with the first function, and the second virtual drive being assigned to the second function of the virtual machine to store therefor a second type of data associated with the second function and that is different than the first type of data; and causing a first number of one or more first physical storage disks to be allocated in accordance with the specified first performance metric and causing a second number of one or more second physical storage disks that are different from the one or more first physical storage disks to be allocated in accordance with the specified second performance metric, the one or more first physical storage disks being mapped to the first virtual drive and the one or more second physical storage disks being mapped to the second virtual drive.

2. The method of claim 1, wherein the first performance metric is different than the second performance metric.

3. The method of claim 1, wherein the first function is one of:

a data function and the first type of data is data associated with a database;

a log function and the first type of data is log information that indicates changes made to the data associated with the database; or a backup function and the first type of data is backup data associated with the database, wherein the second function is one of:

the data function and the second type of data is data associated with the database;

the log function and the second type of data is log information that indicates changes made to the data associated with the database; or the backup function and the second type of data is backup data associated with the database, and wherein the first function is different than the second function.

4. The method of claim 1, wherein the first performance metric corresponds to a first maximum number of input/output operations per second (IOPS) supported by the first virtual drive, and wherein the second performance metric corresponds to a second maximum number of IOPS supported by the second virtual drive.

5. The method of claim 4, wherein the first number of the one or more first physical storage disks that are allocated is determined based on the first maximum number of IOPS and a maximum number of TOPS supported by each of the one or more first physical storage disks, and wherein the second number of the one or more second physical storage disks that are allocated is determined based on the second maximum number of IOPS and a maximum number of IOPS supported by each of the one or more second physical storage disks.

6. The method of claim 5, wherein the first number of the one or more first physical storage disks that are allocated is equal to the first maximum number of IOPS divided by the maximum number of IOPS supported by each of the one or more first physical storage disks, and wherein the second number of the one or more second physical storage disks that are allocated is equal to the second maximum number of IOPS divided by the maximum number of IOPS supported by each of the one or more second physical storage disks.

7. The method of claim 1, wherein the virtual machine is executing on a network-accessible server set comprising a plurality of computing nodes, and wherein the one or more first physical storage disks and the one or more second physical storage disks are maintained by the network-accessible server set.

8. The method of claim 1, wherein the first performance metric corresponds to a first throughput supported by the first virtual drive, and wherein the second performance metric corresponds to a second throughput supported by the second virtual drive.

9. A method, comprising:

providing an interface via which a first performance metric for a first function of a virtual machine and a second performance metric for a second function of the virtual machine are specified; and causing a first number of one or more first physical storage disks to be allocated to a first virtual disk in accordance with the specified first performance metric, the first virtual disk being assigned for use by the first function to store therefor a first type of data associated with the first function, and causing a second number of one or more second physical storage disks that are different from the one or more first physical storage disks to be allocated to a second virtual disk in accordance with the specified second performance metric, the second virtual disk being assigned for use by the second function to store therefor a second type of data associated with the second function and that is different than the first type of data.

10. The method of claim 9, wherein the first performance metric is different than the second performance metric.

11. The method of claim 9, wherein each of the first function and the second function is one of:

a data function configured to access data associated with a database;

a log function configured to access log information that indicates changes made to the data associated with the database; or a backup function configured to access backup data associated with the database, and wherein the first function is different than the second function.

12. The method of claim 9, wherein the first performance metric corresponds to a first maximum number of input/output operations per second (IOPS) supported by the first virtual disk, and wherein the second performance metric corresponds to a second maximum number of IOPS supported by the second virtual disk.

13. The method of claim 12, wherein the first number of the one or more first physical storage disks that are allocated is determined based on the first maximum number of IOPS and a maximum number of TOPS supported by each of the one or more first physical storage disks, and wherein the second number of the one or more second physical storage disks that are allocated is determined based on the second maximum number of IOPS and a maximum number of IOPS supported by each of the one or more second physical storage disks.

14. The method of claim 13, wherein the first number of the one or more first physical storage disks that are allocated is equal to the first maximum number of IOPS divided by the maximum number of IOPS supported by each of the one or more first physical storage disks, and wherein the second number of the one or more second physical storage disks that are allocated is equal to the second maximum number of IOPS divided by the maximum number of IOPS supported by each of the one or more second physical storage disks.

15. The method of claim 9, wherein the virtual machine is executing on a network-accessible server set comprising a plurality of computing nodes, and wherein the one or more first physical storage disks and the one or more second physical storage disks are maintained by the network-accessible server set.

16. A method, comprising:

providing an interface via which a performance metric for a first function of a virtual machine and a second function of the virtual machine is specified, a first virtual drive and a second virtual drive being assigned to the virtual machine, the first virtual drive being assigned to the first function of the virtual machine to store therefor a first type of data associated with the first function, and the second virtual drive being assigned to the second function of the virtual machine to store therefor a second type of data associated with the second function and that is different than the first type of data; and causing an equal number of one or more first physical storage disks and one or more second physical storage disks that are different from the one or more first physical storage disks to be allocated in accordance with the specified performance metric, the one or more first physical storage disks being mapped to the first virtual drive and the one or more second physical storage disks being mapped to the second virtual drive.

17. The method of claim 16, wherein the first function is one of:

a data function and the first type of data is data associated with a database;

a log function and the first type of data is log information that indicates changes made to the data associated with the database; or a backup function and the first type of data is backup data associated with the database, wherein the second function is one of:

the data function and the second type of data is data associated with the database;

the log function and the second type of data is log information that indicates changes made to the data associated with the database; or the backup function and the second type of data is backup data associated with the database, and wherein the first function is different than the second function.

18. The method of claim 16, wherein the performance metric corresponds to a cumulative maximum number of input/output operations per second (IOPS) supported by the first virtual drive and the second virtual drive.

19. The method of claim 17, wherein the equal number of the one or more first physical storage disks and the one or more second physical storage disks is determined based on the cumulative maximum number of IOPS and a maximum number of IOPS supported by each of the one or more first physical storage disks and the one or more second physical storage disks.

20. The method of claim 17, wherein the equal number of the one or more first physical storage disks and the one or more second physical storage disks is determined based on the cumulative maximum number of IOPS, a maximum number of TOPS supported, and a total number of virtual drives assigned to the virtual machine.

* * * * *